UNITED STATES PATENT OFFICE.

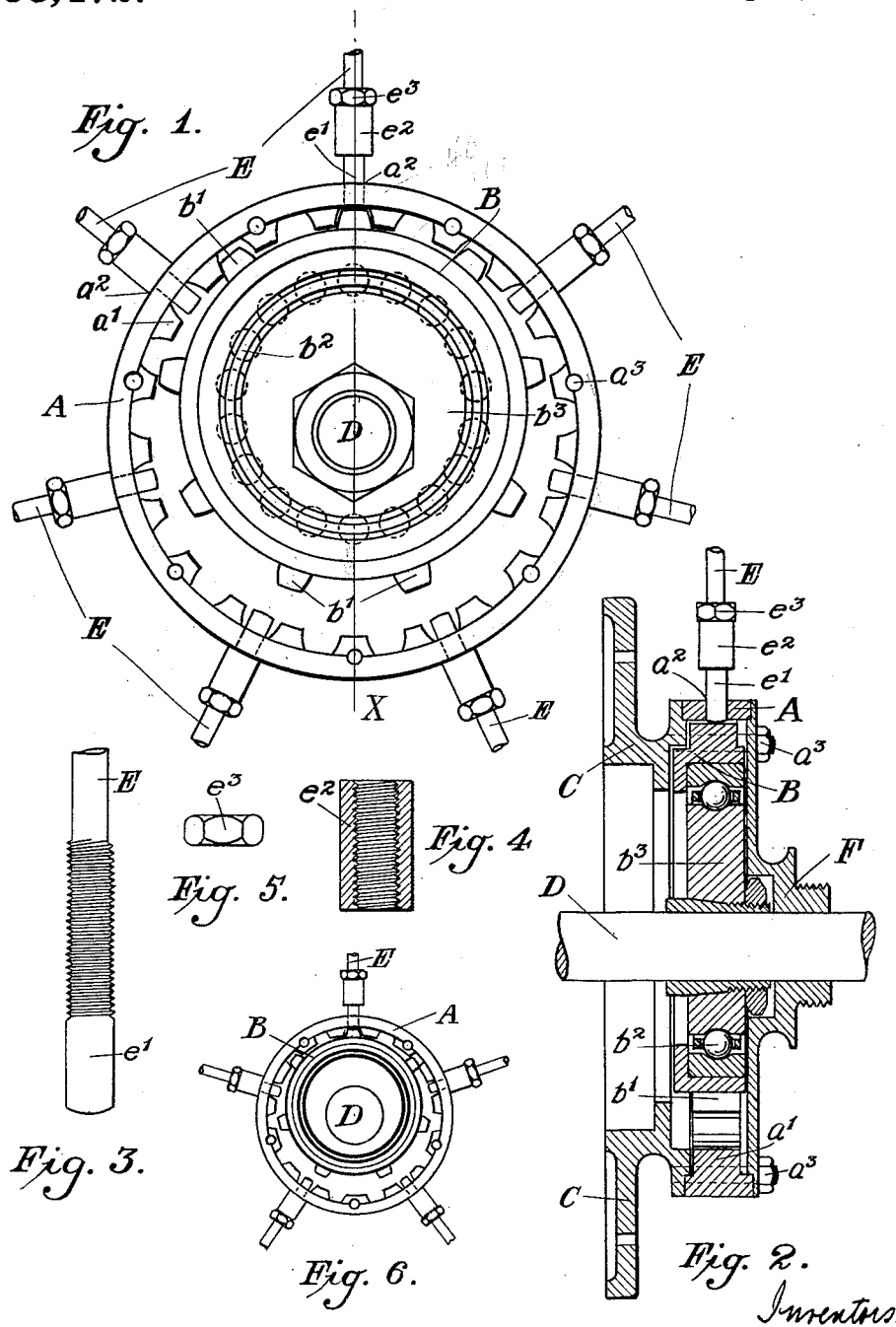

BATEMAN DAVID SCOTT, WILFRED EDWARD SCOTT, AND WILLIAM WENTWORTH PEET, OF GLOUCESTER, ENGLAND.

VALVE-GEAR FOR REVOLVING-CYLINDER INTERNAL-COMBUSTION MOTORS.

1,058,472.  Specification of Letters Patent.  Patented Apr. 8, 1913.

Application filed June 30, 1911. Serial No. 636,247.

*To all whom it may concern:*

Be it known that we, BATEMAN DAVID SCOTT and WILFRED EDWARD SCOTT, subjects of the King of Great Britain, and residents of Ansela House, Parliament street, Gloucester, England, and WILLIAM WENTWORTH PEET, a subject of the King of Great Britain, and a resident of "Varni," Elmbridge Road, Gloucester, England, have invented new and useful Improvements in or Relating to Valve-Gear for Revolving-Cylinder Internal-Combustion Motors, of which the following is the specification.

This invention relates to valve gears and has for its object to provide a means of operating the tappet rods of four stroke cycle internal combustion rotary motors directly by means of a rotatable toothed ring without the employment of 2 to 1 gears or followers to neutralize the side thrust given by the cam to the tappet rods. These motors are usually provided with an odd number of cylinders, five or seven being the more frequent numbers. The cylinders are usually fired in the following rotation, viz: 1, 3, 5, 7, 2, 4, 6, 1 and so on.

In order that the invention may be more readily understood and carried into practical effect, reference is made to the accompanying drawings wherein—

Figure 1 represents in elevation a valve gear for a seven cylinder rotary motor. Fig. 2 is a section on line X of Fig. 1. Figs. 3, 4 and 5, represent respectively the end of a tappet rod, the screw nut used to adjust same and the lock nut to secure the said screw nut. Fig. 6 represents a valve gear for a five cylinder rotary motor.

In carrying out the invention an internally toothed ring A, and an externally toothed ring B are provided, the teeth $b^1$ of the ring B being adapted to mesh with the teeth $a^1$ of the ring A, but are widely spaced so that the distance from tooth to tooth of ring B is double that of ring A. It is preferable to have three times the number of teeth in the ring A, as there are tappet rods to be operated, it is also convenient to let the number of teeth in ring A be equal to double the number of the teeth in ring B plus 1 as in Fig. 6, or plus 3 as in Fig. 1. Other combinations are however suitable for the gear.

The ring A is pierced between every third tooth with holes radiating from the center of the ring, and is secured to the crank case C concentrically with it by means of bolts or screws $a^3$. The ring B is provided with a ball journal bearing $b^2$, the inner race of which $b^3$ is mounted eccentrically on the stationary main shaft D of the motor, by any suitable means, so that the teeth $b^1$ engage with the teeth $a^1$ of the ring A. The heads $e^1$ of the tappet rods E are loosely inserted in the holes $a^2$ and are adjusted by means of screw nuts $e^2$ secured by lock nuts $e^3$. When the motor is rotated, the ring A causes the ring B to revolve on its bearing $b^2$, every second tooth of the ring A engaging with every consecutive tooth of the ring B so that as the tappet rods are three teeth apart every alternate tappet rod is actuated by every third tooth of the ring B, and as the number of tappet rods is odd, they are operated in the rotation of 1, 3, 5, 7, 2, 4, 6, and so on, that is each tappet rod is operated once in every two revolutions of the crank case.

A cap F may be provided fitting over the gear to exclude dust. The gear is of course adaptable to engines having other suitable number of cylinders and is not restricted to the seven or five cylinder arrangement shown.

What we do claim as our invention and desire to secure by Letters Patent is:—

1. In an improved valve operating gear for rotary cylinder four stroke internal combustion engines, an internally toothed ring, means for mounting the ring concentrically with the cylinders, an externally toothed ring adapted to operate within the internally toothed ring, means for mounting the externally toothed ring eccentrically with relation to the internally toothed ring, and a valve rod operated by the teeth of the externally toothed ring.

2. In an improved operating gear for rotary four stroke internal combustion engines, an internally toothed ring, a plurality of valve rods spaced at intervals around and radially slidable through said toothed ring, an externally toothed ring, means for mounting the externally toothed ring eccentrically with relation to the internally toothed ring, means for rotatably mounting the internally toothed ring, the teeth of the externally toothed ring intermeshing with the teeth of the internally toothed ring and engaging and actuating the valve rods.

3. In an improved valve operating gear for rotary four stroke internal combustion engines, an internally toothed ring, an externally toothed ring within the first mentioned ring, a stationary eccentric on which the externally toothed ring is mounted, means for mounting the internally toothed ring concentrically, valve rods adapted to reciprocate radially through the said internally toothed ring in the path of travel of the teeth of the externally toothed ring, whereby said valve rods are actuated.

4. In an improved valve operating gear for rotary internal combustion engines the combination of an internally toothed wheel, an externally toothed wheel for engagement with the teeth of the internally toothed wheel, a stationary eccentric on which the externally toothed wheel is rotatable, means for mounting the internally toothed wheel in operative relation to the externally toothed wheel, and valve rods reciprocally and radially mounted in the internally toothed wheel and projecting therethrough, actuated by the teeth of the externally toothed wheel.

BATEMAN DAVID SCOTT.
WILFRED EDWARD SCOTT.
WILLIAM WENTWORTH PEET.

Witnesses:
E. J. BUSSELL,
L. L. HILCY.

---

Copies of this patent may be obtained for five cents each, by addressing the "Commissioner of Patents, Washington, D. C."